(12) United States Patent
Gouge et al.

(10) Patent No.: US 8,762,984 B2
(45) Date of Patent: Jun. 24, 2014

(54) CONTENT DISTRIBUTION INFRASTRUCTURE

(75) Inventors: Christopher S. Gouge, Redmond, WA (US); Craig Marl, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 11/756,378

(22) Filed: May 31, 2007

(65) Prior Publication Data

US 2008/0301670 A1  Dec. 4, 2008

(51) Int. Cl.
G06F 9/44 (2006.01)
G06F 9/445 (2006.01)

(52) U.S. Cl.
CPC ... G06F 8/65 (2013.01); G06F 8/60 (2013.01)
USPC ............ 717/173; 717/168; 717/171; 717/172

(58) Field of Classification Search
CPC ............... G06F 8/60; G06F 8/61; G06F 8/65
USPC .................................................. 717/168–178
See application file for complete search history.

(56) References Cited

U.S. PATENT DOCUMENTS

| | | | |
|---|---|---|---|
| 5,581,764 A | | 12/1996 | Fitzgerald et al. |
| 5,649,200 A | | 7/1997 | Leblang et al. |
| 5,790,796 A | * | 8/1998 | Sadowsky ..................... 709/221 |
| 5,919,247 A | * | 7/1999 | Van Hoff et al. ............... 709/217 |
| 5,953,005 A | * | 9/1999 | Liu ............................... 715/243 |
| 6,199,204 B1 | | 3/2001 | Donohue |
| 6,202,207 B1 | | 3/2001 | Donohue |
| 6,209,128 B1 | | 3/2001 | Gerard et al. |
| 6,272,536 B1 | | 8/2001 | van Hoff et al. |
| 6,345,386 B1 | | 2/2002 | Delo et al. |
| 6,353,926 B1 | * | 3/2002 | Parthesarathy et al. ........ 717/170 |
| 6,381,742 B2 | | 4/2002 | Forbes et al. |
| 6,405,219 B2 | * | 6/2002 | Saether et al. .......................... 1/1 |
| 6,418,554 B1 | | 7/2002 | Delo et al. |
| 6,434,744 B1 | | 8/2002 | Chamberlain et al. |
| 6,466,932 B1 | | 10/2002 | Dennis et al. |
| 6,493,871 B1 | | 12/2002 | McGuire et al. |

(Continued)

FOREIGN PATENT DOCUMENTS

| | | |
|---|---|---|
| JP | 11136394 | 5/1999 |
| JP | 2000148641 | 5/2000 |

(Continued)

OTHER PUBLICATIONS

Bodnar, et al., "Windows 2000 Deployment Overview at the University of Colorado at Boulder," 2000, ACM, p. 8-13.

(Continued)

*Primary Examiner* — Qing Chen
(74) *Attorney, Agent, or Firm* — Jim Sfekas; Kate Drakos; Micky Minhas

(57) ABSTRACT

Providing content according to a distribution infrastructure. A content provider creates content and organizes the content into a channel. The content included in the channel is described by attributes associated with the channel. The channel is published to a processor and the processor hosts the published channel. A client computing device selectively subscribes to a plurality of published channels. The client computing device aggregates content form the plurality of subscribed channels and provides the aggregated content to a user in a single update experience.

19 Claims, 7 Drawing Sheets

(56) References Cited

U.S. PATENT DOCUMENTS

| | | | |
|---|---|---|---|
| 6,496,974 B1 | 12/2002 | Sliger et al. | |
| 6,523,166 B1 | 2/2003 | Mishra et al. | |
| 6,668,289 B2 | 12/2003 | Cheng et al. | |
| 6,836,794 B1 | 12/2004 | Lucovsky et al. | |
| 6,859,923 B2 | 2/2005 | Taylor | |
| 6,996,818 B2 | 2/2006 | Jacobi et al. | |
| 7,093,246 B2 | 8/2006 | Brown et al. | |
| 7,143,406 B2 | 11/2006 | Kenyon et al. | |
| 7,185,332 B1 | 2/2007 | Waldin et al. | |
| 7,287,068 B1* | 10/2007 | Eriksson et al. | 709/221 |
| 7,313,792 B2 | 12/2007 | Buban et al. | |
| 7,480,907 B1* | 1/2009 | Marolia et al. | 717/174 |
| 7,512,635 B1* | 3/2009 | Solin | 1/1 |
| 7,707,571 B1* | 4/2010 | Harris et al. | 717/177 |
| 7,890,475 B2* | 2/2011 | Demuth et al. | 707/690 |
| 2002/0100036 A1 | 7/2002 | Moshir et al. | |
| 2002/0152229 A1 | 10/2002 | Peng | |
| 2002/0174422 A1 | 11/2002 | Kelley et al. | |
| 2003/0145317 A1 | 7/2003 | Chamberlain | |
| 2003/0220944 A1 | 11/2003 | Lyman Schottland et al. | |
| 2003/0220992 A1 | 11/2003 | DiRico | |
| 2004/0015942 A1 | 1/2004 | Branson et al. | |
| 2004/0044999 A1 | 3/2004 | Gibson | |
| 2004/0083472 A1* | 4/2004 | Rao et al. | 717/171 |
| 2004/0088694 A1 | 5/2004 | Ho | |
| 2004/0181790 A1 | 9/2004 | Herrick | |
| 2004/0187103 A1* | 9/2004 | Wickham et al. | 717/168 |
| 2004/0210653 A1 | 10/2004 | Kanoor et al. | |
| 2005/0050538 A1 | 3/2005 | Kawamata et al. | |
| 2005/0132382 A1 | 6/2005 | McGuire et al. | |
| 2005/0203968 A1 | 9/2005 | Dehghan et al. | |
| 2005/0257214 A1 | 11/2005 | Moshir et al. | |
| 2006/0020938 A1 | 1/2006 | Elcock et al. | |
| 2006/0031226 A1 | 2/2006 | Cope et al. | |
| 2006/0064686 A1* | 3/2006 | Demuth et al. | 717/175 |
| 2006/0085860 A1 | 4/2006 | Zou et al. | |
| 2006/0112384 A1* | 5/2006 | Frank et al. | 717/168 |
| 2006/0129917 A1 | 6/2006 | Volk et al. | |
| 2006/0184927 A1* | 8/2006 | Deblaquiere et al. | 717/168 |
| 2006/0265708 A1 | 11/2006 | Blanding et al. | |
| 2007/0061282 A1 | 3/2007 | Ganguly et al. | |
| 2007/0100957 A1 | 5/2007 | Bhogal et al. | |
| 2007/0240152 A1* | 10/2007 | Li et al. | 717/174 |

FOREIGN PATENT DOCUMENTS

| | | |
|---|---|---|
| JP | 2001147899 | 5/2001 |
| JP | 2002024279 | 1/2002 |
| JP | 2002312243 | 10/2002 |
| JP | 2002351912 | 12/2002 |
| JP | 2003150487 | 5/2003 |
| JP | 2007036919 | 2/2007 |
| WO | 2005089209 A1 | 9/2005 |

OTHER PUBLICATIONS

Nguyen, et al., "NT/windows 2000 User Profile Issues," 2001, ACM, p. 120-122.

Judy, et al., "Windows 2000 Deployment Technical Challenges at the University of Colorado at Boulder," 2000, ACM, p. 141-145.

Bakker, Arno, et al., A Wide-Area Distribution Network for Free Software, http://citeseer.ist.psu.edu/cache/papers/cs/27807/http:zSzzSzwww.cs.vu.nlzSzpubzSzpaperszSzglobezSzIR-CS-002.03.pdf/bakker03widearea.pdf, Jan. 30, 2003, 32 pages, Internal Report IR-CS-002.

Author Unknown, BMC Configuration Management (Formerly Marimba), Solutions & Products, http://www.bmc.com/products/prodcuts_services_detail/0,,0_0_0_1301,00.htm, printed Jun. 6, 2007, 2 pages, BMC Software, Inc.

Author Unknown, IBM Service Management Platform, IBM Service Management Platform solutions from IBM Tivoli sofware, http://www-306.ibm.com/software/tivoli/solutions/it-service-management-platform/, 4 pages, updated May 18, 2007, printed Jun. 6, 2007, IBM.

* cited by examiner

CONTENT DISTRIBUTION INFRASTRUCTURE

BACKGROUND

Electronic content (hereinafter "content") is increasingly used by society to perform services and to provide information. Accordingly, as services are upgraded and information changes, content must be updated. The update content may include updated information (e.g., news updates, weather reports, stock updates, new magazine articles and the like) or updated products and services (e.g., software updates, bug fixes, new software products, recently released videos, television episodes, or songs, upgrades to email and internet services, subscriptions to view or use content provided by a website, and the like). Generally, update content may be delivered to a client computing device using one or more of a plurality of forms of computer readable media. For example, computer readable storage media which includes updated content may be used to deliver the updated content to the client computing device. Alternatively, the update content may be provided via one or more data communication networks, such as the internet. Several different formatting techniques are available for embodying updated content in each of the plurality of forms of computer readable media. As a result of the multitude of options for formatting and delivering updated content to a client computing device, content consumers (e.g., users of the client computing devices) are burdened with a plurality of inconsistent update experiences (required interactions by the content consumer to receive the update content).

Because software and hardware are frequently updated to comply with rapid improvements in technology, providing content related to software and hardware updates is particularly burdensome for both content consumers, including end-users and organization administrators, and content providers, such as independent software vendors (ISVs), independent hardware vendors (IHVs), and/or original equipment manufacturers (OEMs). Since the internet allows information to be provided quickly and globally, the internet is often used to by content providers to distribute updates or other content to a large number of content consumers. However, many small content providers are focused on development of their core product and lack the operations team and server infrastructure necessary to manage a distribution system on an internet scale. Moreover, even when content providers have the resources to distribute the updates via the internet, the content providers require content consumers to use content-specific or provider-specific software programs or to visit particular web sites or in order to receive the updated content. Accordingly, content provided by each content provider involves a specific update experience. Because end-users are interested in receiving software and hardware updates from a plurality of different content providers, content consumers must navigate through a plurality of update experiences in order to receive the updated software and hardware content. Likewise, corporate content consumers lack a single unified automatic update distribution system for all products used in their organization. Administrators must seek out updates for each software and hardware product and import the updates into their system.

Thus, a need exists, for a unified distribution infrastructure which can be used by all content providers to provide their updates to content consumers via a single update experience.

SUMMARY

Embodiments of the invention overcome one or more deficiencies of existing practices for providing content to the content consumers by providing a unified distribution infrastructure. According to aspects of the invention, the unified distribution infrastructure can be used by a plurality of diverse content providers, advantageously facilitating the distribution of content to content consumers. In addition, aspects of the unified distribution infrastructure advantageously allow content consumers to selectively receive different types of content and/or content from a plurality of content providers via a single user experience.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Embodiments of the invention provide electronic content from a variety of content providers to a content consumer in a single federated or aggregated update experience. According to aspects of the present invention, content providers organize content into channels and publish the channels to a distribution processor. Content consumers (broadly "users"), such as end users, server administrators and content aggregators subscribe to various channels published on the distribution processor in a single update experience. Updates from the subscribed channels are accordingly processed directly by the content consumer or aggregated and distributed to other content consumers.

Figure 1:
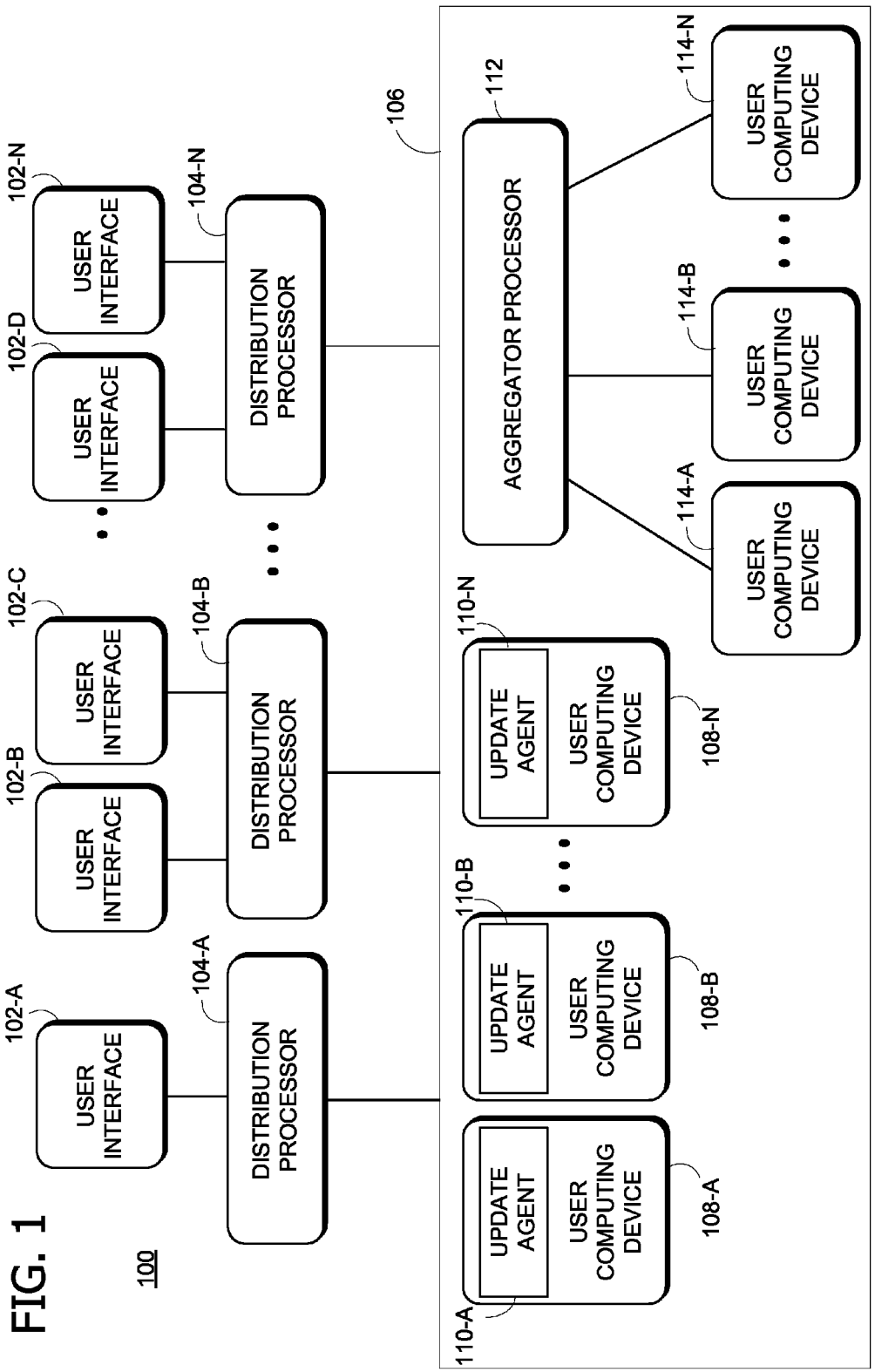
FIG. 1 is a block diagram illustrating an exemplary environment in which an embodiment of the present invention can be implemented to provide content to a client computing device.

Referring to FIG. 1, a block diagram illustrates an exemplary network environment in which aspects of the present invention can be implemented. A system 100 provides content from a plurality of content providers (see FIGS. 2-7) to one or more client devices 106. In general, the system 100 includes at least one interface 102, such as a user interface or a programming interface (e.g., application programming interface, processes, etc.) for interacting with the content providers and at least one distribution processor 104. The interface 102 and the distribution processor are connected via a wired (e.g., wired network or direct-wired connection) and/or a wireless (e.g., acoustic, radio frequency (RF), infrared) communication media. In one embodiment, a computing device having an input and output device(s) (e.g., monitor, keyboard, mouse, touch screen, microphone, speakers, and the like) comprises the interface 102 and the distribution processor 104. In another embodiment, the interface 102 and the distribution processor 104 each include computing devices in a data communication network (e.g., local area network (LAN), wide area network (WAN), and the like). For example, the distribution processor 104 may be one or more servers connected to an intranet or to the internet and the interface 102 may be a personal computer (PC) or other digital device which is also connected, respectively, to the intranet or to the internet.

The interface 102 interacts with a content provider to develop a channel. A channel comprises channel content and channel attributes which define the channel content or channel behavior. According to one embodiment, each content provider selects and/or creates content for including in a channel via the interface 102. Additionally, each content provider interacts with the interface 102 to establish channel attributes defining the selected and/or created content. For example, the interface 102 may include a developing application which can be used by each of the plurality of content providers to select/create content and to define the channel attributes. The set of channels attributes are consistently used by the plurality of content providers to describe content in the channels. An exemplary set of channel attributes include attributes which indicate the content provider of the channel, procedures for validating the content authenticity of the channel content, content consumer authentication requirements, and restrictions applicable to client computing devices. In other embodiments, additional or alternative channel attributes are used to define and describe the content of the channel. For example, channel attributes may include content such as images, text, or instructions for interactive experiences that are used by the update agent 110, further discussed below, to customize the uniform infrastructure of the user experience on the user computing device 108 when content is downloaded or installed from that channel. For example, an embodiment of the uniform user experience on the user computing device 108 may provide functionality to display branding images, text, or experiences as part of the user experience, with the branding information provided by the content provider as an attribute of the channel. In an additional example, the user experience on the user computing device may provide a facility to direct the user to the content provider's web site or other location with the experience and destination specified as an attribute of the channel. By employing a set of channel attributes which are used by various content providers to define content, the present invention advantageously provides a uniform infrastructure for providing content to client devices 106.

The interface 102 further interacts with a content provider to publish the channel to the distribution processor 104. The distribution processor 104 hosts the published channel. The content provider manages the hosted channel via the interface 102. In particular, the content provider may create and publish new data to the hosted channel. Additionally or alternatively, the content provider may modify (e.g., alter, delete, revise, etc.) the attributes or content of the hosted channel. In one embodiment, the distribution processor 104 additionally hosts channels published to it by another content provider(s) (e.g., distribution processor 104-B hosts channels published via user interfaces 102-B, 102-C from different content providers).

The distribution processor 104 is connected to the client devices 106 via a wired (e.g., wired network or direct-wired connection) and/or a wireless (e.g., acoustic, radio frequency (RF), infrared) communication media such that the client devices 106 may communicate with the distribution processor 104. The distribution processor 104 is configured to permit client devices 106 (e.g., requestors) which are requesting to receive content from a channel hosted by the distribution processor 104 to access the hosted channel based on the attributes of the published channel. For example, when the hosted channel attributes indicate that particular client devices 106 are restricted from accessing the channel, the distribution processor 104 prohibits the particular client devices 106 (e.g. requestors) from accessing the channel. In particular, client devices or users may be restricted by identity or by descriptive attributes of the hardware or software on the client device. Likewise, when the hosted channel attributes indicate that user authentication is required, the hosted channel permits access by client devices 106 (requesters) to the channel as a function of authenticating the user of the client device 106.

Referring further to FIG. 1, according to one embodiment, a content provider may develop and publish a plurality of channels. Additionally, the content provider may select and/or create content which is included in several or all of the plurality of channels. For example, a content provider may be a software vendor of a first product (e.g., a word processing application) and of a second product (e.g., a business suite which includes the word processing application along with several other applications). The software vendor may interact with the interface 102 to develop a first channel for providing content updating the word processing application for client devices 106 having installed the first product. The software vendor may also interact with the interface 102 to develop a second channel for providing content updating the business suite for client devices 106 having installed the second product. In this example, the software vendor can create an update for the word processing application and include the update in both the first and the second channels. The first and second channels may be published to the same distribution processor 104 or to separate distribution processors 104.

As illustrated by FIG. 1, the client devices 106 include a computing device(s) 108 (user computing device) of an end-user content consumer (user). As generally known in the art, a computing device (e.g., aggregator computing device 112, user computing device 108, 114, interface computing device 102, distribution computing device 104) has one or more processors, a system memory, and a bus coupling the processor to the memory. The computing device may also include an input device (e.g., mouse, trackball, pen, pad, microphone, and the like) and/or an output device (e.g., monitor, speaker, printer, and the like) for interacting with a user. The memory includes computer readable storage media (e.g., removable, non-removable, volatile, non-volatile memory) for storing information used to perform various functions. The computer readable storage media of the user computing device 108 includes instructions (e.g., an update agent 110) for interacting with a user and accessing a hosted channel from the distribution processor 104 and presenting (e.g., downloading) content from hosted channel according to the user interaction (e.g., user specifications/requests).

In one embodiment, the update agent 110 allows a user to select a particular channel for which the user would like to receive content. For example, when a user installs a software application on the user computing device, the update agent 110 prompts the user to subscribe to the channel which includes content for updating the software application. Alternatively, the software application may be designed such that when a user installs the software application on the user computing device 108, the software application interacts with the update agent 110 to register for automatic updates from the channel which includes content for updating the software application. In another embodiment, the update agent 110 additionally or alternatively allows the user to specify how or when the content is displayed to the user. For instance, the user may request the update agent 110 to notify the user prior to downloading a first set of content to the user computing device 108. The user may request the update agent 110 to automatically download a second set of content at a particular time and display the downloaded content to the user at another subsequent particular time. In another embodiment, the update agent 110 stores identifying information, such as user information (e.g., login ID, password, email address, a channel subscription identifier, hardware or software identifiers, etc.), required by a channel to authenticate the user. The user may request the update agent 110 to automatically provide the required user information to the distribution processor 104 for authenticating the user with respect to a particular channel.

In one embodiment, the present invention is implemented to provide the user computing device 108 with software updates from channels developed by a plurality of content providers and hosted by a distribution processor 104. The user submits a request to the update agent 110 indicating one or more channels for which the user would like to subscribe (e.g., receive new content subsequently published to the channel). For example, the update agent 110 may indicate to the user the channels hosted by the distribution processor 104 for selecting by the user. In response, the user submits the request to the update agent 110 by selecting one or more of the indicated channels. The update agent 110 receives the user's request and subscribes to the requested channel(s). The update agent 110 may alternatively subscribe to channels in response to a request for automatic updates received from a software application being installed on the user computing device. The update agent 110 communicates with the distribution processor 104 to identify new content in one or more of the subscribed channels. The new content includes a new software update and may also include computer readable and/or executable information for installing the software update on the user computing device 108. When the update agent 110 identifies new content, the update agent 110 accesses the channel and downloads the new content based on the channel attributes (e.g., providing user authentication, authenticating the content provider) and/or specifications from the user (e.g., automatically provide authentication information) and/or descriptive information provided to the distribution processor 104 (e.g., descriptive/identifying attributes of/associated with the user computing device 108). The downloaded new content is installed on the user computing device 108 based on specifications from the user (e.g., installation time). Advantageously, the user may receive software updates from a plurality of content providers in a single update experience.

In another embodiment, the present invention is implemented to provide the user computing device 108 with software updates from channels developed by a plurality of content providers and which are hosted by a plurality of distribution processors 104 (e.g., channel sources). As previously described, the update agent 110 subscribes to channels requested by the user and/or software application being installed and identifies new content in the subscribed channels. The update agent 110 aggregates the identified new content from the plurality of content sources on the user computing device 108. For example, the update agent 110 downloads the identified new content to the user computing device 108 based on the channel attributes defining the new identified new content. The update agent 110 subsequently installs the aggregated content on the user computing device 108 according to specifications from the user.

As further illustrated by FIG. 1, the client devices 106 may additionally or alternatively include an aggregator processor 112 that communicates content to another client device 106, a computing device of an end user 114. The aggregator processor 112 is controlled by or otherwise interacts with a service administrator to provide a service, as discussed below, for communicating content to an end user via a user computing device 114. In providing the service, the aggregator processor 112 performs many of the functions which were previously discussed as being performed by the update agent 110. In one embodiment, the aggregator processor 112 receives a request from the service administrator to subscribe to or register with channels hosted by a plurality of content sources. In another embodiment, the aggregator processor 112 receives a request from a user via the user computing device 114 to subscribe to or register with channels hosted by a plurality of content sources. The requests may define preferences for receiving content from the content sources. For example, the requests may specify a time for receiving content from the content sources. The aggregator processor 112 is configured to communicate accordingly with the content sources of the requested channels to subscribe to/register for the requested channels. As a result of registering, the aggregator processor 112 receives content, including new content which is subsequently included in the channels, from the registered channel sources. The aggregator processor 112 aggregates the received content based on the channel attributes defining the content and distributes the aggregated content, as a single channel, to the user computing device(s) 114. In one embodiment, each of the user computing devices 108 includes an update agent for receiving the distributed aggregated content as a single channel from the aggregator processor 112 and installing the updated content on the user computing device 114.

In one embodiment, the aggregator processor 112 examines the received content and alters and/or distributes the aggregated content based on the examination. For example, the aggregator processor 112 may define channel attributes for the single channel which includes the aggregated data. Additionally or alternatively, the aggregator processor 112 may alter (e.g., modify, delete, supplement, etc.) the aggregated content based on the preferences or needs of a potential recipient user and/or the components of a user computing device 114. For instance, prior to distributing multimedia content to a particular user, an aggregator processor 112 may alter the multimedia content so that it can be accessed by a user with software currently installed on the user computing device 114. In another example, the aggregator processor 112 may additionally or alternatively group the aggregated content into sets. For instance, the aggregator processor 112 may group all of the content which relates to basic anti-virus protection into a first set and group all of the content which relates to extensive anti-virus protection into a second set. The aggregator processor 112 may then distribute the first set to any/all user computing devices 114 but distribute the second set only to preferred user computing devices 114 (e.g., 114-A and 114-B).

Figure 2:
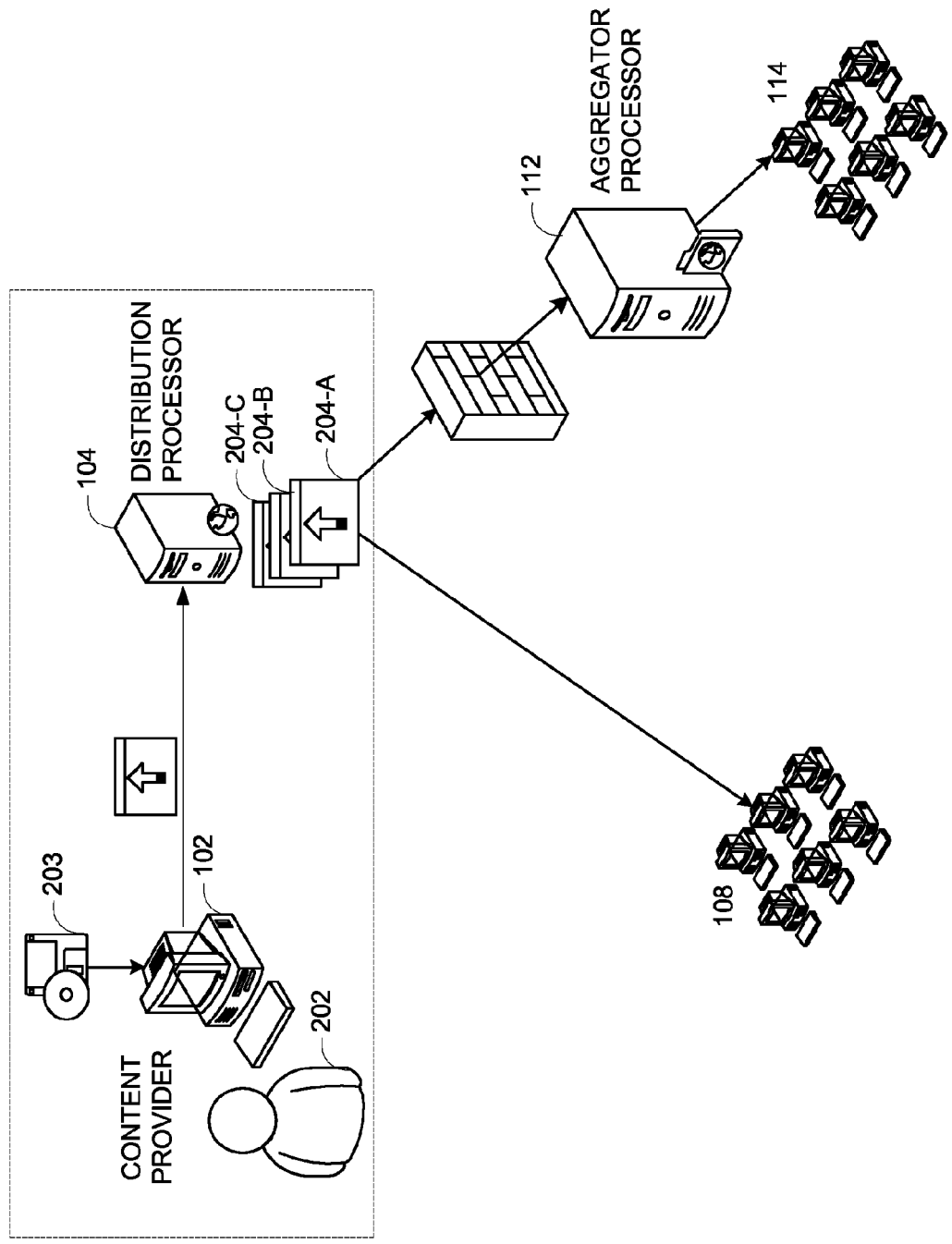
FIG. 2 is a block diagram illustrating a small software vendor providing content to a client device through a third-party distribution processor, according to one embodiment of the present invention.

FIGS. 2-7 illustrate exemplary environments for implementing various embodiments of the present invention. Referring to FIGS. 2-5, embodiments of the present invention allow a plurality of diverse content providers to efficiently provide content to content consumers in a single update experience. Referring to FIG. 2, embodiments of the present invention allow content providers to host their own content via channels such that the content is provided to a content consumer in a single update experience. In the illustrated embodiment, a content provider, such as a large software vendor 202, develops channels. The large software vendor 202 also hosts the developed channels from an on-site distribution processor, such as a server 104. Particularly, the large software vendor 202 may install a channel developing application 203 on a local computing device 102 to develop channels and publish the channels to a local server 104. The server 104 is configured to host the channels and communicates with client devices 108, 112 to distribute the updates 204 to content consumers via a single update experience.

Figure 3:
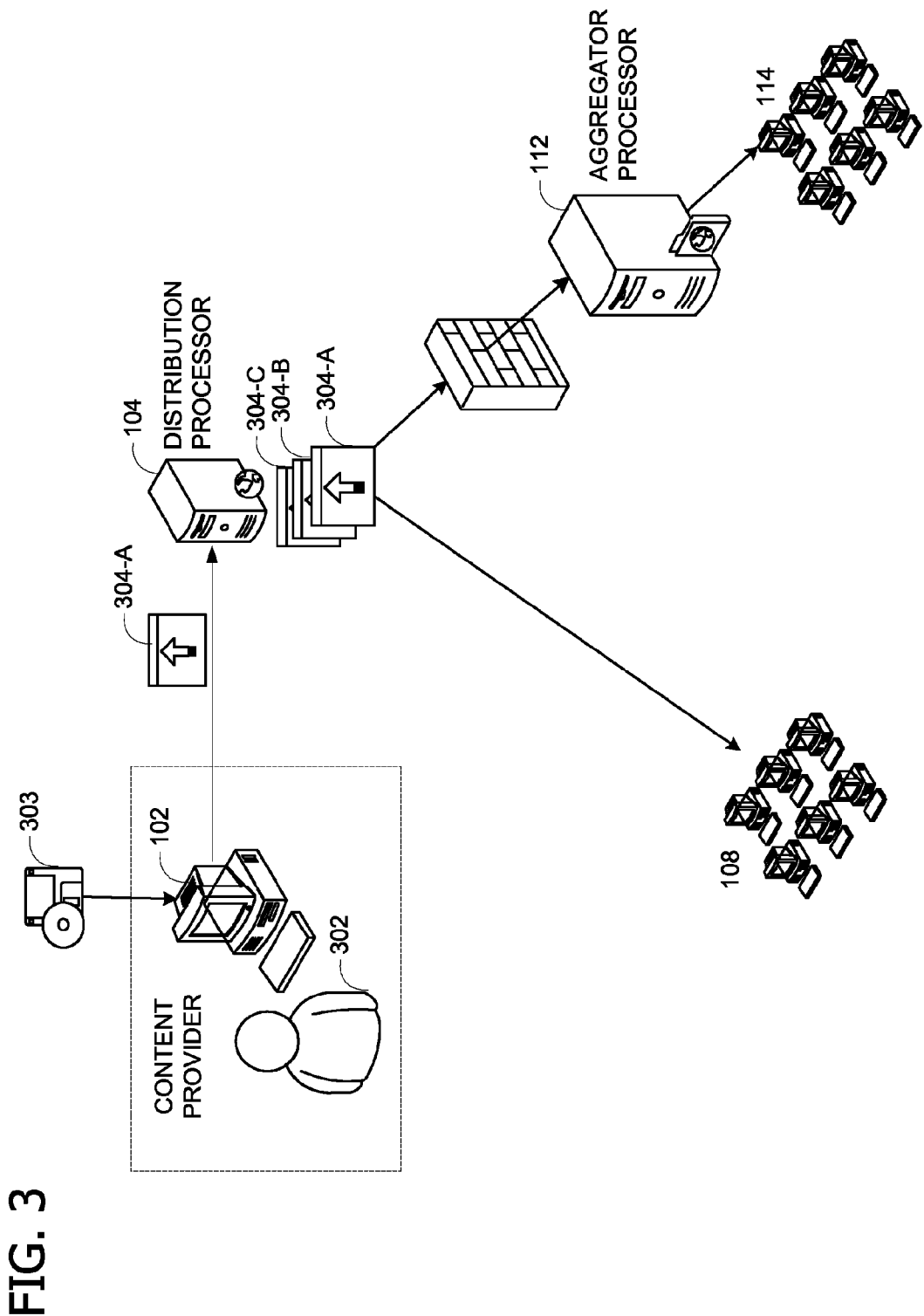
FIG. 3 is a block diagram illustrating a large software vendor providing content to a client device through their own distribution processor, according to one embodiment of the present invention.

According to an embodiment of the invention illustrated by FIG. 3, the distribution processor 104 may host channels developed content providers of other entities in addition or as an alternate to hosting channels developed by content providers of the same entity. Accordingly, embodiments of the present invention allow a content provider 302, such as small entity, to provide content 304-A to user computing devices 108 even though the small entity 302 alone may lack the infrastructure to do so. For example, the small entity 302 may be a small independent software vendor that produces medical office software for the dental industry. Since the small independent software vendor 302 is focused on the development of its software, it may lack the operations team and server infrastructure to manage an update distribution system. According to the illustrated embodiment, aspects of the present invention may be implemented such that a distribution processor 304 offers a service wherein the distribution processor 104 will host the small independent software vendor's updates 304-A for a fee. Accordingly, the small independent software vendor 302 interacts with a interface 102 to develop a channel. Particularly, the small independent software vendor 302 may install a channel developing application 303 on a local computing device 102 to help the small independent software vendor 302 efficiently develop, manage, and publish the channel. The distribution processor 104 hosts the channel and manages the distribution of the channel content to content consumers such as end-users 108 and aggregators 112. The distribution processor 104 may track the number of channel users, rate of uptake on new updates, rate of successful installs by consumers, or other metrics as part of the service provided to the content provider.

Figure 4:
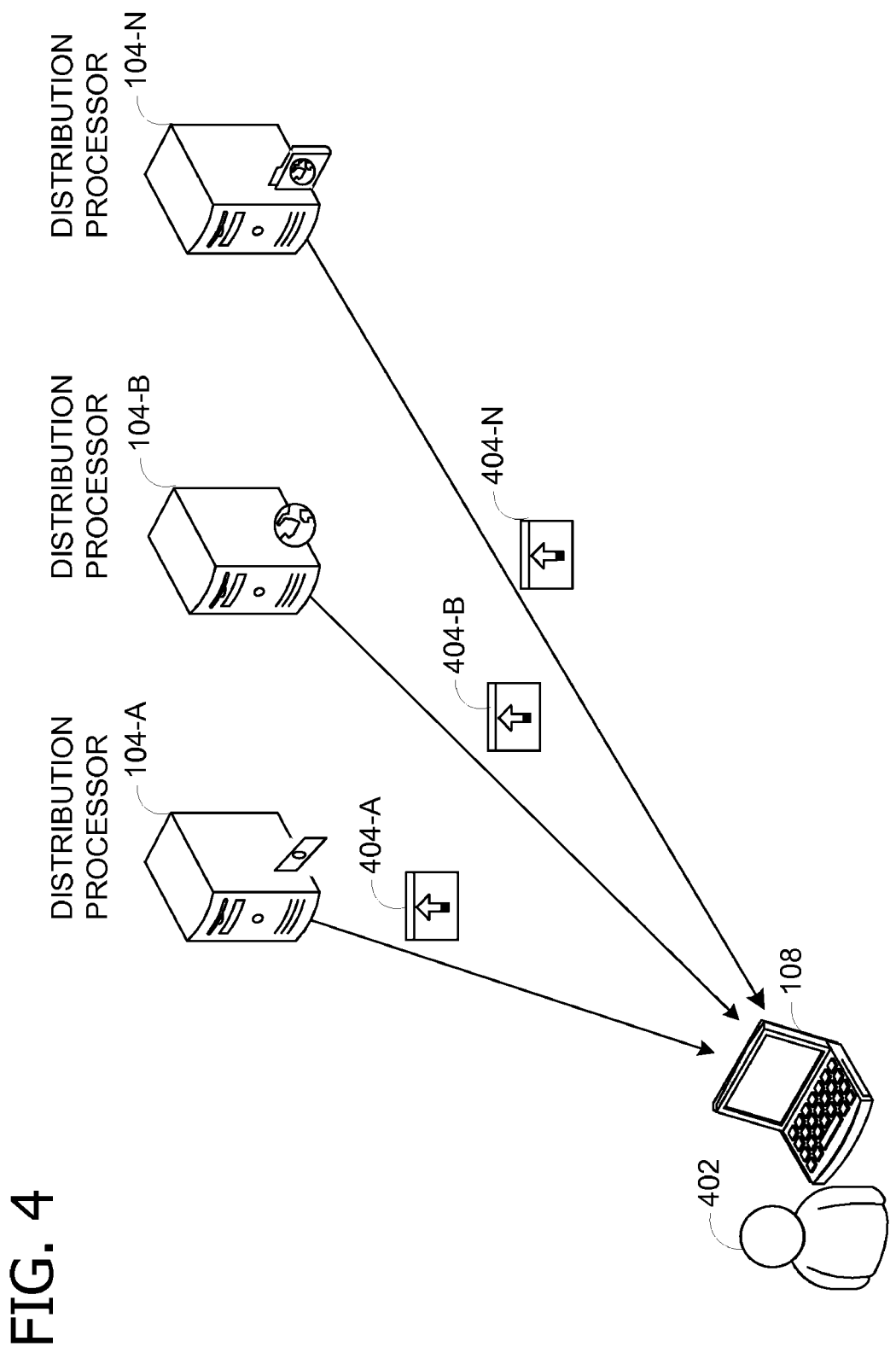
FIG. 4 is a block diagram illustrating a client device aggregating content from a plurality of distribution processors, according to one embodiment of the present invention.

Referring to FIG. 4, because the present invention provides a federated infrastructure for providing content, an end-user 402 can receive content 404 from a plurality of content sources (e.g., distribution processors) 104 in a single update experience. An update agent installed on the user computing device 108 communicates with a plurality of content sources 104 (e.g., the distribution processor hosting the small software vendor's channels, the on-site server hosting the large software vendor's channels, etc.) to provide the user 402 with a single unified update experience. Thus, instead of interacting individually with each content source 104 and/or content provider, the user 402 can interact with the update agent in order to receive updates from the plurality of content sources 104 and providers. According to one embodiment, when the user 402 installs a new application, the update agent allows the user 402 to choose to subscribe to updates for the new application. Additionally or alternatively, the update agent may interact with software applications installed on the user computing device 108 in order to set up automatic updates for the installed software. In addition to providing and scheduling updates, the update agent collects and conveniently displays update information to the user 402. For example, the update agent allows the user to check a list of installed software, to view updates being automatically downloaded and installed, to remind him when his premium subscriptions to content (e.g., anti-virus updates) expire, and/or whether there are updates available. The update agent may provide the ability to set values related to subscription, download, and install of updates globally, on a per channel basis, or in some combination thereof.

Figure 5:
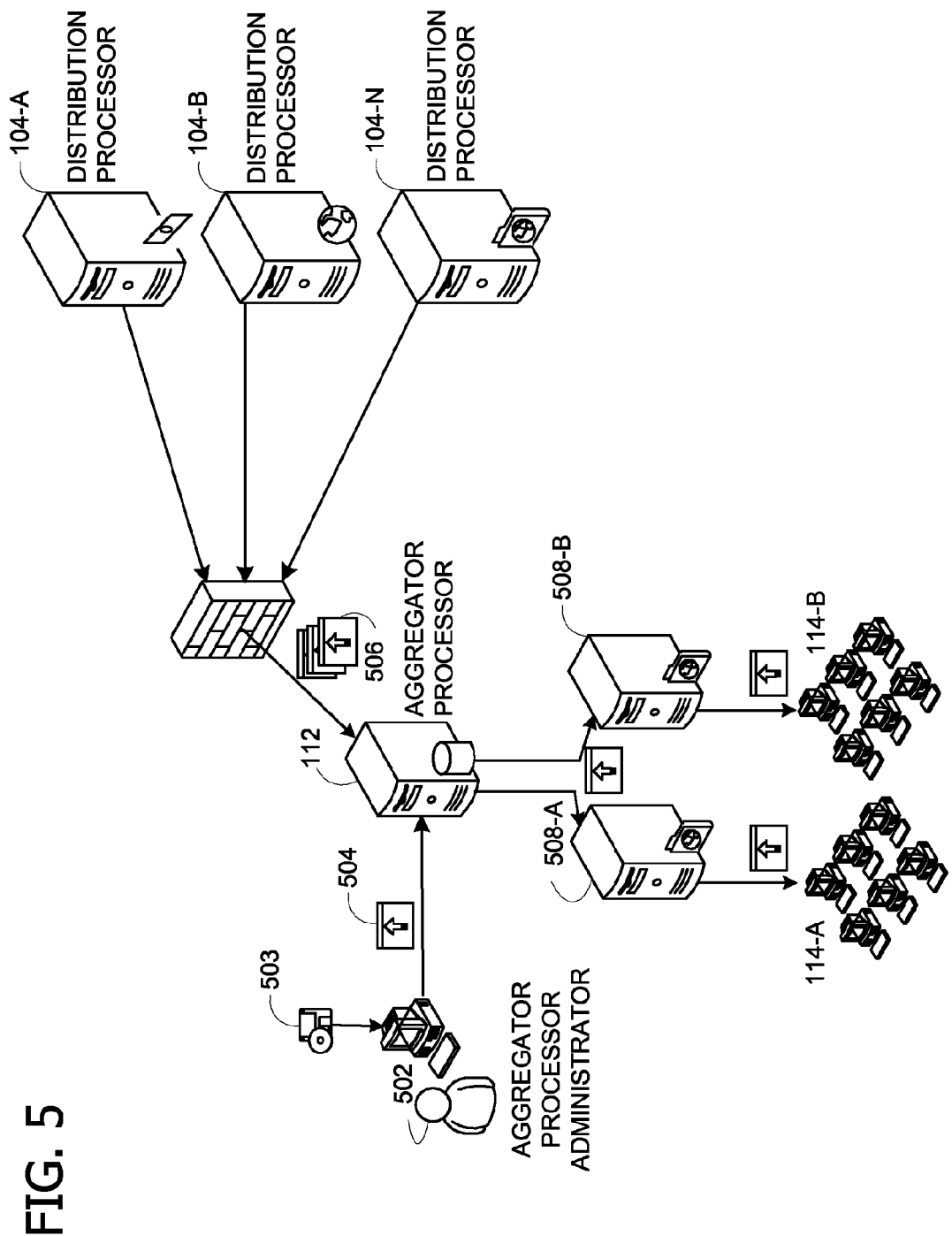
FIG. 5 is a block diagram illustrating a corporate aggregator processor aggregating content from a plurality of distribution processors for deploying to corporate computing devices, according to one embodiment of the present invention.

Referring to FIG. 5, the federated infrastructure of the present invention also allows administrator 502 of an aggregator processor such as a corporate IT server administrator, to conveniently and efficiently publish and host content 504 and to receive content 506 from a plurality of content sources (e.g., distribution processors) 104. According to the illustrated embodiment, the aggregator processor 112, such as a corporate IT server, is configured to communicate with a plurality of distribution processors 104. For example, the administrator 502 may configure the server 112 to subscribe to channels providing updates to software installed on the corporation's end-user computing devices 114. The server 112 then aggregates the content from the channels for distributing to the corporation's end-user computing devices 112 via intermediate servers 508-A, 508-B. In one embodiment, the server 112 is also configured to deploy a policy for controlling behavior of the update agent on the end user computing devices 114, such as automatically downloading and/or installing the aggregated content at specified times, restricting the end user computing device to a set of approved channels, or modifying the experience provided to the end-user. In one embodiment, the server 112 is configured to filter the content to include only the updates needed by the end-users of the corporation and/or explicitly approved by the administrator 502 prior to deploying the content. Additionally, the administrator 502 may add additional content 504 (e.g., via a developing application 503 installed on a local computing device 102) for updating in-house applications.

Still referring to FIG. 5, the administrator 502 may also deploy a policy specifying/controlling/defining an installation process for installing the aggregated content on the end user computing devices 114. For example, the administrator may control via the policy the time when the content should be downloaded to the server 112 (e.g., aggregated) and when the content should be deployed. The aggregator may provide the ability to set filter and deployment values on a per channel basis, globally for all subscribed channels, or in some combination thereof. Advantageously, the administrator 502 can maximize the efficiency of the corporation's network by strategically scheduling the downloading of content from the distribution processors 104 and the deployments of the downloaded content to end user computing devices 114. For example, the administrator 502 may schedule downloads at 4 am, examine and/or modify the downloaded content during the day, and schedule to deploy the content at 11 pm. Thus, the administrator 502 is able to avoid overcrowding the network by effectively scheduling software updates. Although described with respect to this exemplary embodiment as a server, it is to be understood that aggregator processor 112 is a client computing device relative to the distribution processor 104.

Figure 6:
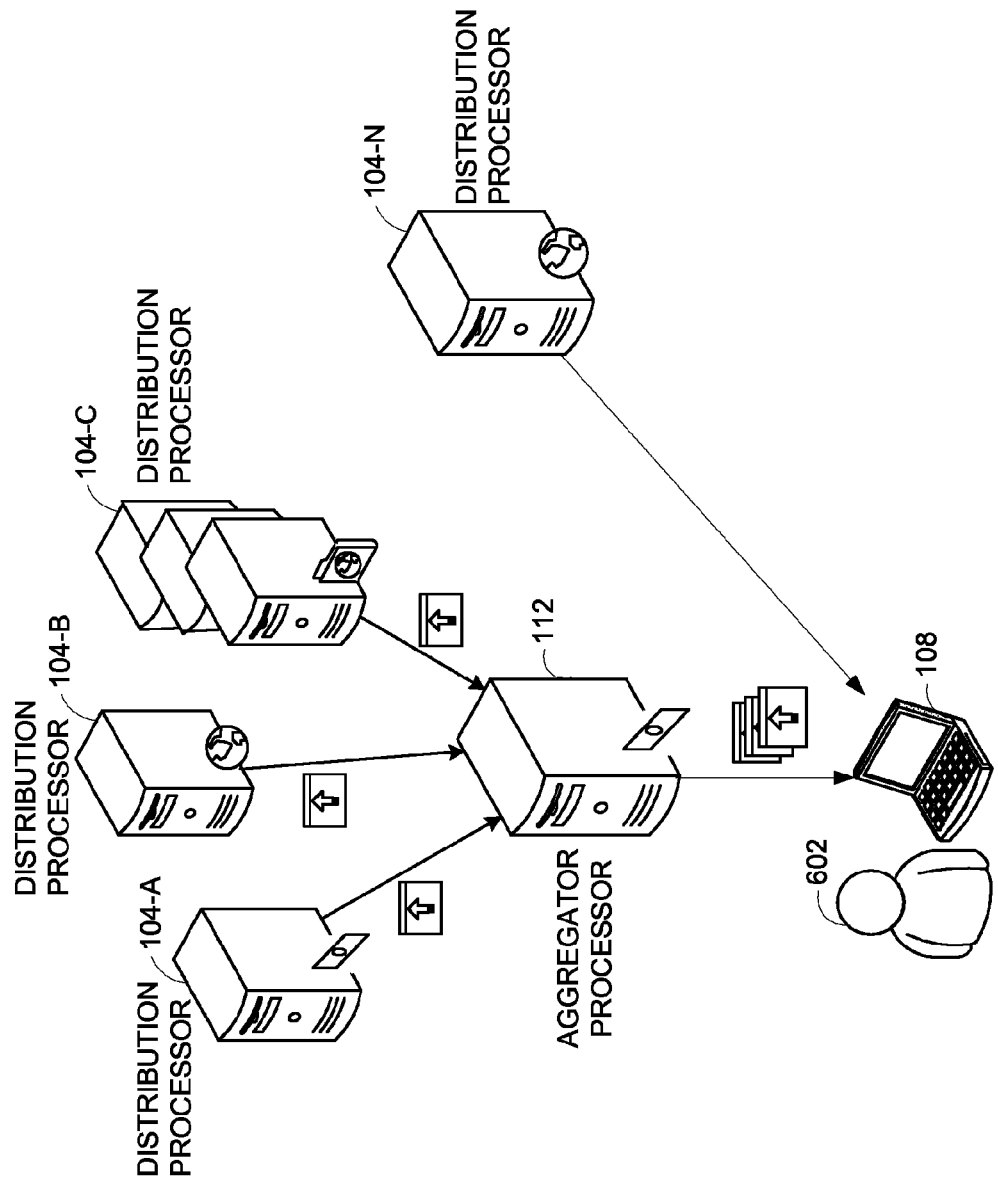
FIG. 6 is a block diagram illustrating an original equipment manufacturer (OEM) aggregating content from a plurality of distribution processors for distributing to computer systems manufactured by the OEM, according to one embodiment of the present invention.

Referring to FIG. 6, a federated infrastructure of the present invention may be used by a service administrator, such as an original equipment manufacturer (OEM), to provide updates for users of OEM computer systems 108. For example, a user 602 of an OEM computing device 108 may subscribe to an OEM update program offered by the OEM. The OEM manages an aggregator processor 112 to aggregate content from various distribution processors 104-A, 104-B, 104-C for drivers and applications that it bundles on its computer systems 108. The OEM tests the aggregated content and distributes the approved content to end-users 602. The update agent on the user computing device 108 receives the OEM updates as well as updates distributed from other distribution processors 104-N. The update agent installs the received updates according to the user's specifications.

Figure 7:
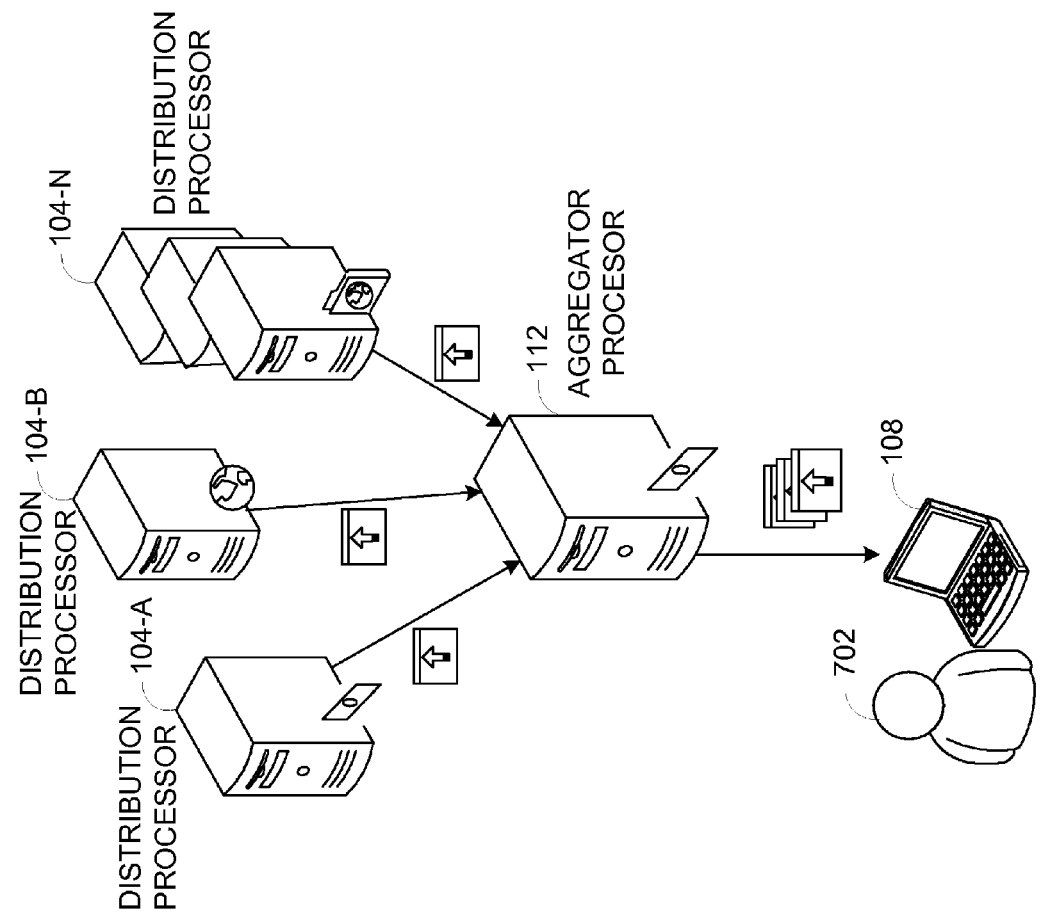
FIG. 7 is a block diagram illustrating an aggregation service for aggregating content from a plurality of distribution processors for automatically updating software installed on a client device, according to one embodiment of the present invention.

Referring to FIG. 7, the federated infrastructure according to aspects of the present invention may be used by an update service provider to provide updates for all of the software installed on a user computing device 108. For example, a user 702 may not want to manage software updates on the user's computing device 108. Instead, the user 702 may subscribe to an update service provider. The update service provider is an aggregator processor (e.g., aggregator processor 112) configured to aggregate content from a plurality of distribution processors 104 for updating the software installed on the user's computing device 108. The update service provider transmits the aggregated updates to the user's computing device 108 and an update agent installed on the user's computing device 108 automatically installs the updates.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of providing content to a client computing device, the method comprising:
   registering with a plurality of channel sources to receive content from one or more channels hosted by the plurality of channel sources, wherein each of the one or more channels comprises channel content and channel attributes for defining the channel content;
   identifying channel content in the registered plurality of channel sources;
   receiving channel content from the registered plurality of channel sources in response to registering with the plurality of channel sources;
   validating the content authenticity of the channel content received from the registered plurality of channel sources;
   aggregating the validated channel content based on the channel attributes defining the channel content;
   distributing the aggregated channel content to the client computing device; and
   installing the aggregated channel content on the client computing device based on specifications from a user of the client computing device in a single installation experience.

2. The method of claim 1 further comprising defining preferences for receiving channel content from the registered plurality of channel sources, wherein the channel content received from the registered plurality of channel sources is received according to the defined preferences.

3. The method of claim 1 wherein aggregating the validated channel content includes altering the validated channel content.

4. The method of claim 1 wherein aggregating the validated channel content includes examining the validated channel content, and wherein the aggregated channel content is distributed to the client computing device based on the examination.

5. The method of claim 1 further comprising deploying a policy to the client computing device, wherein the policy controls an installation process for installing the aggregated channel content on the client computing device.

6. The method of claim 1 further comprising receiving descriptive information associated with the client computing device, wherein the aggregated channel content is distributed to the client computing device based on the received descriptive information.

7. The method of claim 1 further comprising:
   creating, by a channel provider, channel content;
   establishing, by the channel provider, channel attributes defining the created channel content; and
   publishing, by the channel provider, a channel comprising the created channel content and the channel attributes to one of the plurality of channel sources.

8. A method of updating a software application on a client computing device, the method comprising:
   subscribing to one or more update channels, wherein each of the one or more update channels comprises channel content published by a plurality of channel content providers for updating the software application, and wherein each of the one or more update channels further comprises channel attributes for defining the channel content;
   identifying new channel content in the one or more subscribed update channels;

receiving the new channel content in the one or more subscribed update channels based on the channel attributes defining the channel content;

validating the content authenticity of the received new channel content in the one or more subscribed update channels;

accumulating the validated new channel content based on the channel attributes defining the channel content;

downloading the accumulated new channel content to the client computing device; and installing the accumulated new channel content on the client computing device based on specifications from a user of the client computing device in a single installation experience.

9. The method of claim 8 further comprising receiving a request from the user of the client computing device to receive channel content from the one or more update channels, wherein subscribing to the one or more update channels is responsive to the received request.

10. The method of claim 8 further comprising receiving a request from the software application to receive updates to the software application from the one or more update channels, wherein subscribing to the one or more update channels is responsive to the received request.

11. The method of claim 8 wherein receiving the new channel content in the one or more subscribed update channels is based on information describing attributes of the client computing device.

12. The method of claim 8 further comprising validating the content authenticity of the identified new channel content based on the channel attributes defining the identified new channel content.

13. The method of claim 8 further comprising notifying the user of the client computing device of the accumulated new channel content and receiving from the user of the client computing device a response to the notification, wherein the response specifies whether to install the accumulated new channel content.

14. The method of claim 8 wherein the specifications from the user indicate a time for installing the accumulated new channel content.

15. The method of claim 8 wherein the channel attributes for an update channel indicate one or more of the following: a channel content provider of the update channel, procedures for validating the content authenticity of the channel content, user authentication requirements, and restrictions applicable to client computing devices subscribing to the update channel.

16. A system for providing content to a computing device, the system comprising:

a user interface configured to interact with a plurality of channel content providers to develop and publish a plurality of channels, wherein each of the plurality of channels comprises channel content and channel attributes defining the channel content; and a processor configured to execute computer-executable instructions to:

host the plurality of published channels, receive a request from the computing device for channel content in a specified channel being hosted by the processor, determine if the computing device is restricted from receiving the requested channel content based on the channel attributes for the specified channel, receive the requested channel content in the specified channel hosted by the processor based on the determining, validate the content authenticity of the received channel content in the specified channel according to the channel attributes for the specified channel, wherein the channel attributes include procedures for validating the content authenticity of the received channel content in the specified channel, aggregate the validated received channel content according to the channel attributes defining the requested channel content, distribute the aggregated received channel content according to the received request and the channel attributes defining the requested channel content, and install the aggregated received channel content on the computing device based on specifications from a user of the computing device in a single installation experience.

17. The system of claim 16 wherein the channel content includes updates for a software product.

18. The system of claim 16 wherein receiving a request includes receiving identifying information from a requestor of the request and authenticating the requestor based on the received identifying information.

19. The system of claim 16 wherein the channel attributes for a channel indicate one or more of the following: a channel content provider of the channel, user authentication requirements, and restrictions applicable to computing devices subscribing to the channel.

* * * * *